US009517501B2

(12) United States Patent
Chin et al.

(10) Patent No.: US 9,517,501 B2
(45) Date of Patent: Dec. 13, 2016

(54) SHEET FORMING TOOL AND A METHOD FOR THE MANUFACTURE OF A CORRUGATED SHEET

(75) Inventors: Kimwah Chin, Pudong Shanghai (CN);
Xiaolei Sheng, Pudong Shanghai (CN);
Yang Li, Pudong Shanghai (CN);
Lhoden Chothutshang, Winterthur (CH)

(73) Assignee: Sulzer Chemtech AG, Winterthur (CH)

( * ) Notice: Subject to any disclaimer, the term of this patent is extended or adjusted under 35 U.S.C. 154(b) by 49 days.

(21) Appl. No.: 14/232,847

(22) PCT Filed: Jul. 21, 2011

(86) PCT No.: PCT/CN2011/001197
§ 371 (c)(1),
(2), (4) Date: Jan. 14, 2014

(87) PCT Pub. No.: WO2013/010293
PCT Pub. Date: Jan. 24, 2013

(65) Prior Publication Data
US 2014/0157856 A1    Jun. 12, 2014

(51) Int. Cl.
*B21D 13/02*    (2006.01)
*B29C 53/24*    (2006.01)
(Continued)

(52) U.S. Cl.
CPC .............. *B21D 13/02* (2013.01); *B21D 13/10* (2013.01); *B29C 53/24* (2013.01); *B31F 1/247* (2013.01); *Y10T 428/12354* (2015.01)

(58) Field of Classification Search
CPC ................. Y10T 428/24694; Y10T 428/2471; Y10T 428/2457; B21D 13/00; B21D 53/00; B21D 11/20; B21D 11/206; B29C 51/082
See application file for complete search history.

(56) References Cited

U.S. PATENT DOCUMENTS 4,450,705 A * 5/1984 Vidal-Meza .............. F28F 3/08
29/890.039
4,659,323 A    4/1987 Ito et al.
(Continued)

FOREIGN PATENT DOCUMENTS

CN    201410522 Y    2/2010
FR    2 946 270 A1    12/2010
(Continued)

*Primary Examiner* — Peter DungBa Vo
*Assistant Examiner* — John S Lowe
(74) *Attorney, Agent, or Firm* — Larson & Anderson, LLC

(57) ABSTRACT

A sheet forming tool (1) for the manufacture of a corrugated sheet has a lower tool element (40) and an upper tool element (50), each of the upper tool element and the lower tool element having a front side (23, 33, 41) and a rear side (25, 35, 42). The lower tool element (40) comprises a first base element (2, 4, 6, 8) and a first finger element (3, 5, 7, 9) projecting from said first base element (2, 4, 6, 8). The first finger element (3, 5, 7, 9) forms a first ridge (22, 24, 26, 28) for forming a corrugation peak in the sheet. The upper tool element (50) comprises a second base element (12, 14) and a second finger element (13, 15) projecting from said second base element (12, 14), the second finger element (13, 15) forming a second ridge (32, 34) for forming a corrugation trough in said sheet. The first ridge (22, 24, 26, 28) is arranged opposite to the second ridge (32, 34) and the first ridge (22, 24, 26, 28) is offset from the second ridge (32, 34) so as to allow for an engagement of the first finger element (3, 5, 7, 9) and the second finger element (13, 15) in an engaged position. Each of the first ridge (22, 24, 26, 28) and second ridge (32, 34) comprises a main portion (20) and an end portion (11, 21) and the angle ? (36) between each of the first ridge (22, 24, 26, 28) and second ridge (32, 34) in the main portion (20) and the corresponding front side (23, 33, 41) is at least partly different from the angle between each of the first ridge (22, 24, 26, 28) and second ridge (32, 34) in the end portion (11, 21) and the corresponding front side
(Continued)

and a space is provided between the first finger element (3, 5, 7, 9) and the neighboring second finger element (13, 15) in the engaged position.

18 Claims, 7 Drawing Sheets

(51) Int. Cl.
  *B31F 1/24* (2006.01)
  *B21D 13/10* (2006.01)

(56) References Cited

U.S. PATENT DOCUMENTS

| | | | |
|---|---|---|---|
| 5,340,301 | A | 8/1994 | Saffire et al. |
| 6,206,349 | B1 | 3/2001 | Parten |
| 6,461,559 | B1 | 10/2002 | Bär |
| 6,500,048 | B1 | 12/2002 | Bär |
| 7,024,907 | B2 * | 4/2006 | Beauvois ............... B21D 13/02 72/385 |
| 7,147,215 | B2 | 12/2006 | Lehman et al. |
| 2004/0093927 | A1 | 5/2004 | Leon et al. |
| 2004/0261354 | A1 | 12/2004 | Gigola |
| 2011/0229689 | A1 * | 9/2011 | Giang ..................... B01J 19/32 428/141 |

FOREIGN PATENT DOCUMENTS

| | | |
|---|---|---|
| JP | 52-030469 | 8/1975 |
| JP | 51-54065 A | 5/1976 |
| JP | 60-174218 A | 9/1985 |
| JP | 62-160613 A | 7/1987 |
| JP | 2008087033 A | 4/2008 |

* cited by examiner

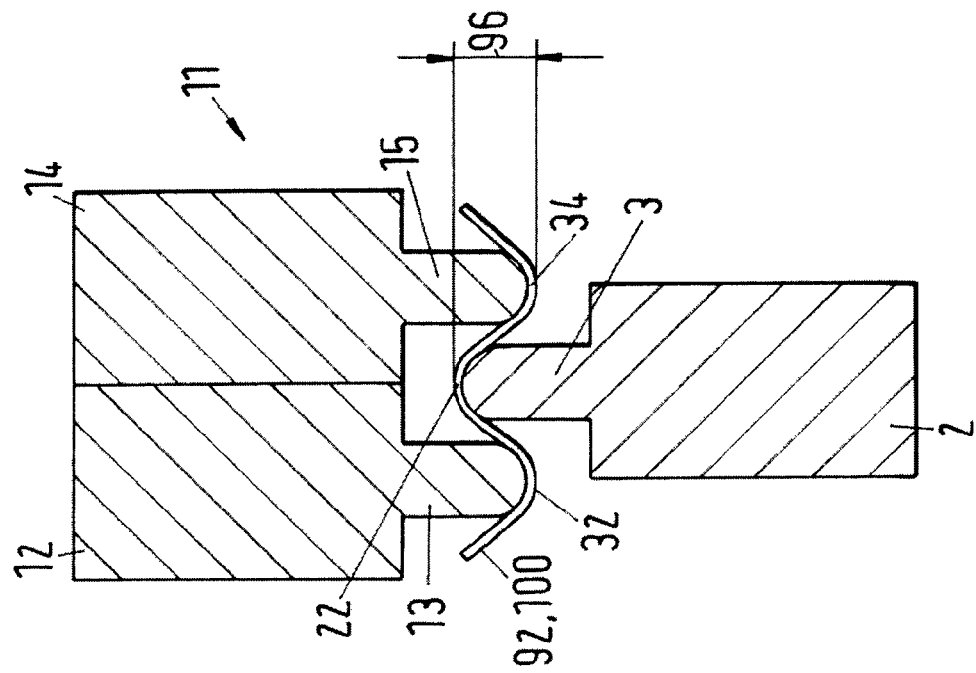
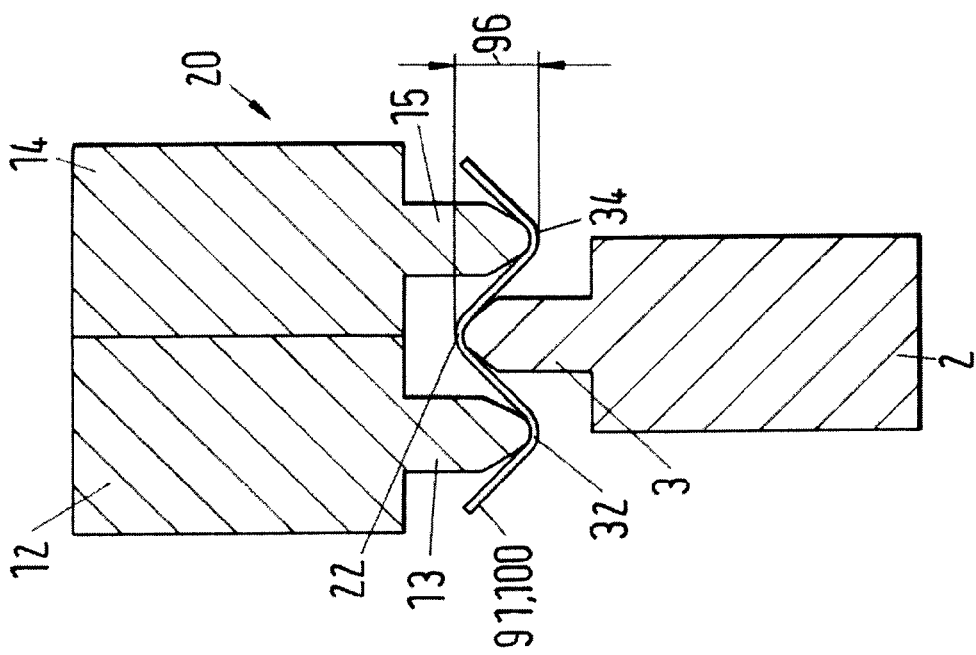

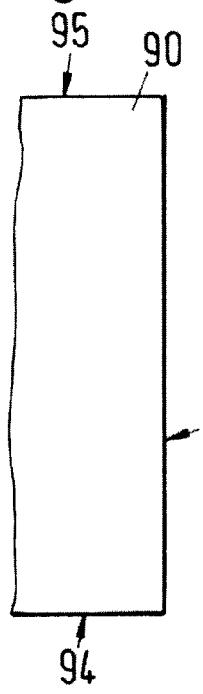
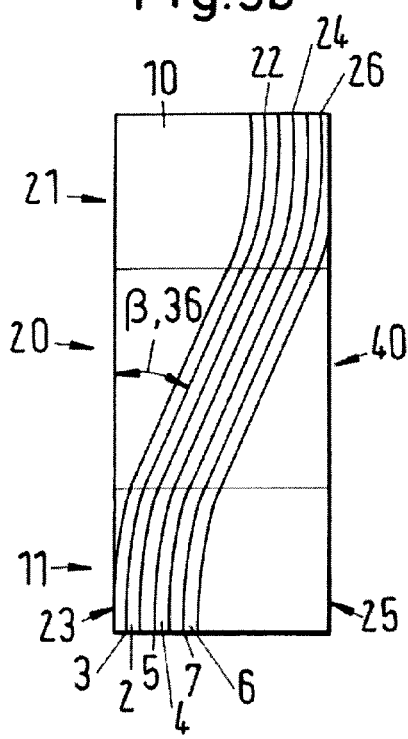
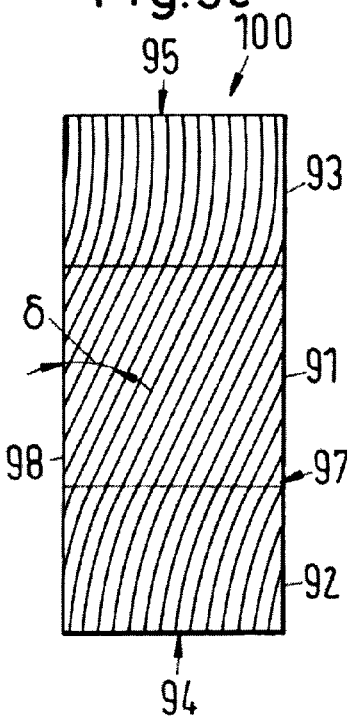
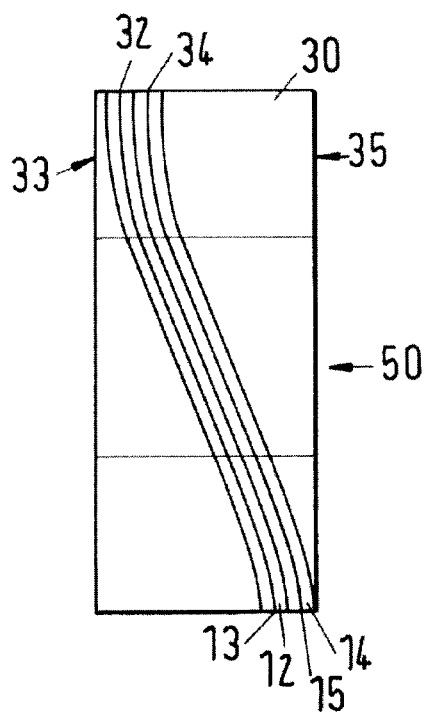

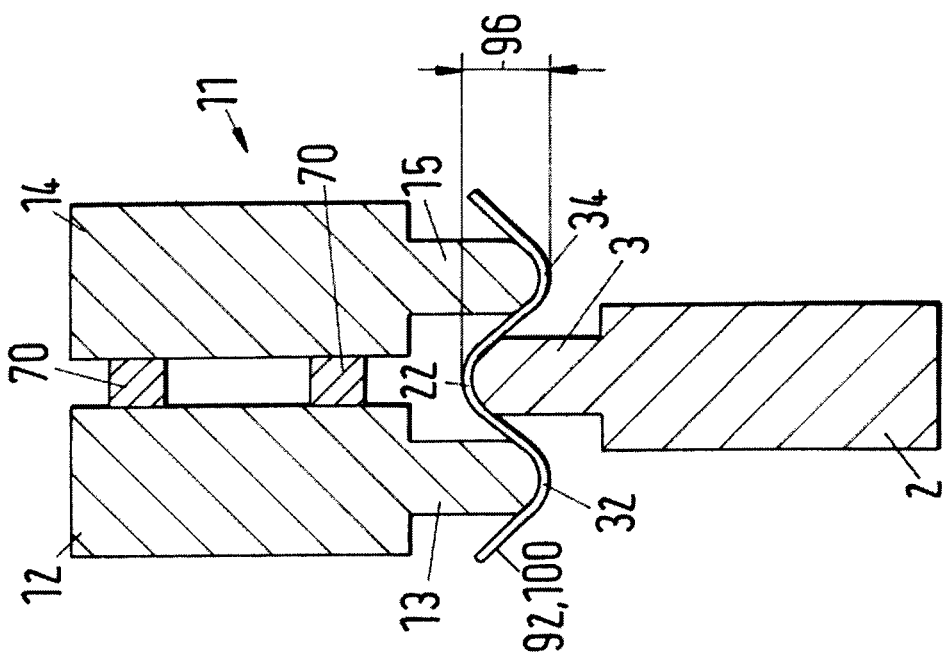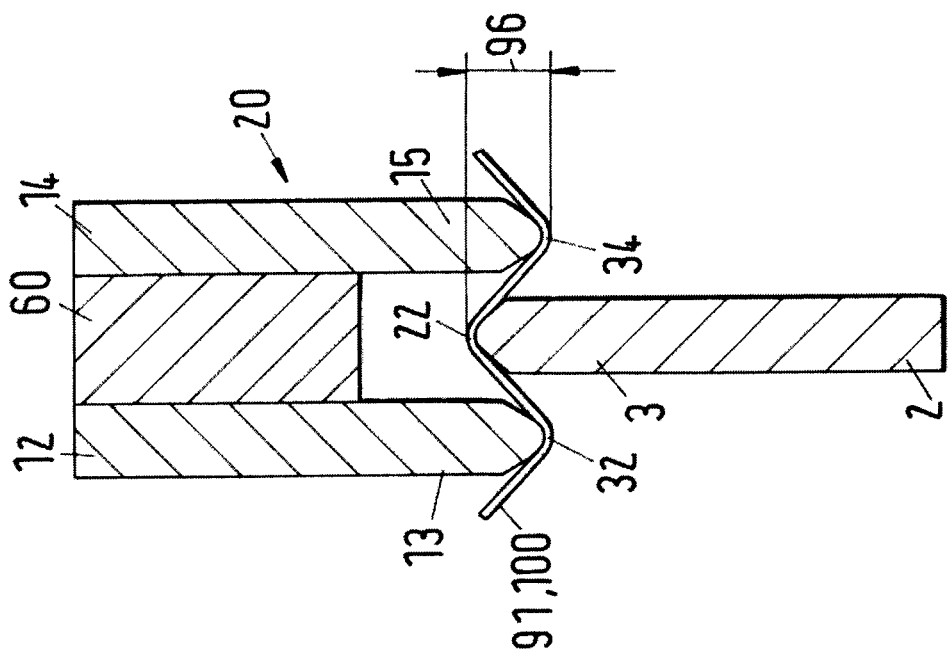

SHEET FORMING TOOL AND A METHOD FOR THE MANUFACTURE OF A CORRUGATED SHEET

The present invention relates to a sheet forming tool and a method for the manufacture of a corrugated sheet. The corrugated sheet manufactured by the tool can be used as a layer for a structured packing. Such a structured packing can be used as an installation in a mass transfer apparatus for improving the mass or heat transfer between at least two fluid phases flowing through the mass transfer apparatus. The fluid phases may comprise a gas phase and a liquid phase. The mass transfer apparatus may be configured as a mass transfer column to perform a unit operation involving such a mass transfer, for instance a rectification column or an absorption column.

An example for a structured packing is shown in WO97/16247. The structured packing of WO97/16247 is composed of a plurality of packing elements arranged in succession in a designed direction of fluid flow. The structured packing thus forms one of a plurality of packing elements stacked upon each other in the column. Each packing element includes a plurality of packing layers which are configured as crimped sheets of material arranged in a face-to-face relationship. Each of the packing layers is disposed with corrugations extending obliquely relative to the direction of fluid flow between opposite ends of the sheets. A means for reducing pressure drop is imposed in a continuous phase at each interface between successive packing elements. This means for reducing pressure is arranged at or in the vicinity of the interface and the means is constituted by a localized change in configuration of the corrugations immediately adjacent the interface. At least some of the crimped sheets of each packing element have at least some corrugations with a crimp angle extended to the interface. The packing layer has a corrugation end section terminating in a corrugation end section substantially continuously curving from the corrugation end to a remainder of the corrugation so that the crimp angle varies progressively in the vicinity of at least one of the interfaces. Furthermore, the crimp angles of corrugation ends abutting at the interface are parallel, so that an angle of fluid flow leaving a given one of the corrugation ends of one sheet enters the abutting corrugation sheet of the adjoining packing element at the same angle. The crimp angle within the body of the packing element in an intermediate portion is substantially a constant and the progressively varying crimp angle is greater than the constant.

The portion to each packing layer, for which this localized change of configuration applies, has lead to a surprisingly to a reduced pressure drop as compared to previous solutions.

However, the introduction of a first and second end portion requires a more complex manufacturing process. Thus, the manufacturing of a packing layer in accordance with WO97/16247 requires a stepwise method comprising a plurality of forming steps. A possible manufacturing method is disclosed in U.S. Pat. No. 6,461,559. The method involves a first step of shaping a corrugation pattern onto a strip like film and at least a second step, in which a first and second end portion for this corrugation pattern is shaped. The first and second end portions are formed by rollers which apply the corrugation pattern for each of the end portions onto the previously corrugated sheet. The corrugation pattern involves a progressive change of the angle of corrugation. A plurality of rollers can be arranged in sequential relationship with respect to the sheet, thus the sheet passes over the rollers, so as to shape the corrugation pattern.

According to the teaching of U.S. Pat. No. 6,461,559, it is thus necessary to foresee a sheet forming tool for forming the corrugation of the main portion and a roller tool for applying the progressively changing corrugation pattern of the first and second end portions.

It is therefore the object of the present invention to propose an improved sheet forming tool, which allows to complete the manufacture of a corrugated sheet having a main portion and at least one end portion in a single step. It is thus an object of the invention to simplify the manufacturing process.

In the document EP 1 231 051 B1 a punching tool has been disclosed, which allows for exerting a folding and pressing operation on a strip of metal passing therethrough. The tool comprises two dies arranged oppositely to each other. Each of the dies has a shape substantially corresponding to the shape of the structured packing layer. The packing layer of EP 1 231 051 B1 is a corrugated sheet as disclosed in WO97/16247.

In operation, the dies of the punching tool are closed. Thereby the sheet is trapped between the dies and the distance between the dies substantially corresponds to the thickness of the sheet. When the two dies are closed, a pressure force is exerted onto the sheet. Thereby the structure of the die is imposed onto the sheet to shape it into a corrugated sheet. Due to the fact that the sheet is trapped between the dies during the punching operation, the sheet is subjected to a high local stress in particular in the end portions thereof. This stress may lead to a partially elastic deformation of the sheet in each of the end portions. Consequently, after the dies have been opened, the shape of the corrugation may be subject to changes due to its partial restitution to the original shape. This effect leads to corrugations of inferior height at the end portions compared to the main portion of the corrugated sheet. The punching tool as disclosed in EP 1 231 051 B1 generates a structured packing sheet with a varying height of corrugation. This tool purposely allows corrugation height to be lower in the end portion.

When the corrugated sheets are stapled to form a structured packing, neighbouring corrugated sheets contact each other. If the height of the corrugation varies in the end portion and in the main portion, neighbouring sheets are in contact only in the main portion. This has a negative effect on the stability of the structured packing formed by a plurality of such corrugated sheets. Consequently the alignment of the structured packing layers becomes more difficult. Furthermore asymmetries may result due to the misalignment. Such asymmetries may lead to a maldistribution of the fluids passing the structured packing during operation, and thereby lower the performance of the mass transfer apparatus.

Consequently it is an object of the invention to increase the manufacturing precision of a corrugated sheet having a main portion and at least one end portion so as to provide a corrugated sheet of constant height.

The height of the corrugation of the corrugated sheet is defined as the normal distance between a corrugation trough and a corrugation peak. Habitually the height of corrugation is in a range of between 5 mm to 50 mm.

This object is accomplished by a sheet forming tool for the manufacture of a corrugated sheet having a lower tool element and an upper tool element. The upper tool element and the lower tool element have a front side and a rear side. A sheet is arranged between the lower tool element and the upper tool element. The sheet moves from the front side to the rear side. The lower tool element comprises a first base element and a first finger element projecting from said first base element. The first finger element forms a first ridge for forming a corrugation peak in the sheet. The upper tool element comprises a second base element and a second finger element projecting from said second base element, the second finger element forming a second ridge for forming a corrugation trough in said sheet. The first ridge is arranged opposite to the second ridge and the first ridge is offset from the second ridge so as to allow for an engagement of the first finger element and the second finger element in an engaged position. Each of the first ridge and second ridge comprise a main portion and an end portion. The angle β between each of the first ridge and second ridge in the main portion and the corresponding front side is at least partly different from the angle between each of the first ridge and second ridge in the end portion and the corresponding front side. A space is provided between the first finger element and the neighbouring second finger element in the engaged position. The space is measured in the plane, in which the sheet enters the shape forming tool. The space is thus an open space. This open space is present between the main portion as well as the end portion when the upper and lower tool elements are in their engaged position. The sheet is thus in contact with the upper and lower tool element only at the ridges of the finger elements forming the top portions thereof, thus the crests. Between the ridge of the first finger element and the ridge of the second finger element, the sheet is not in contact with either finger element but is allowed to form freely in the space between two adjacent top portions.

The packing layer formed by the shape forming tool is thus a corrugated sheet. The corrugations form an angle δ of inclination with the axis of the mass transfer apparatus. This angle δ of inclination of such a corrugation lies typically between 10° and 70°. The corrugated sheet has a main section and an end section. Each of the main section and the end sections is disposed with a corrugation or in most cases a plurality of corrugations. The angle of inclination of a corrugation of the end section differs from the angle δ of inclination of the main section. In an embodiment, a first and a second end section may be provided. The main section may be arranged between the first end section and the second end section. The angle of inclination of a corrugation of the first and second end section can change progressively, whereas the angle δ of inclination of the corrugations in the main section can be constant. The progressive change of the angle in the first and second end section results in a decrease of the angle the corrugation forms with the main direction of fluid flow, which habitually corresponds to the main axis of the mass transfer apparatus. At the edge of the sheet, the angle may be reduced to 0°. In this case, the corrugation is oriented parallel to the axis of the mass transfer apparatus.

The sheet can in particular be a thin-walled metal sheet or a fabric. In the engaged position, a corrugation is formed on the sheet by the deformation thereof due to the engagement of the first and second ridges. The sheet is folded over the first and second ridges. Thereby a wave-like structure is imposed onto the sheet. Each of the ridges forms the top portion of a finger element. The finger element has a smaller thickness than the base element. The thickness transition from the base element to the finger element involves a step. The finger element has a first face and a second face. The first face is oriented towards the front end of the tool. The second face is oriented towards the rear end of the tool. The front end of the tool receives the sheet to be corrugated. The corrugated sheet leaves the tool on its rear end. The first face can extend at least partially in a plane which is parallel to the plane in which the second face lies.

The space provided between the first and the second finger element is greater than the thickness of the corrugated sheet. Advantageously the space is greater than twice the thickness of the corrugated sheet. A corrugated sheet is in general of a thickness of less than 2 mm, preferably 1 mm or less. In a particularly preferred embodiment, the thickness of the corrugated sheet is in the range from 0.1 up to and including 0.2 mm. The space is greater than 2 mm, in particular greater than 3 mm, particularly preferred greater than 4 mm.

The sheet may in the simplest version be made of steel. Depending on the chemical composition of the fluids passing over the corrugated sheet, when in operation in a mass transfer apparatus, the sheet may be also made of titanium, aluminium, copper or alloys thereof or be coated with a coating such as a ceramic coating. The sheet may comprise a gauze, in particular comprise a metal wire gauze. A composite gauze may be applied as an alternative, such a composite gauze comprising metal wires and wires of non-metallic material. For the non-metallic material any type of carbon-based material may be employed. According to an alternative embodiment, glass or basalt may be employed. Thus in particular organic compositions may be employed, such as polymers. Such polymers may comprise polyesters as employed for textile material, silicones, polyethylene, polypropylene, polyetheretherketone, polyterephtalate, polycarbonate, polylactide, just to name a few examples.

The shape of the first and second ridge is the same. However, due to the fact, that the second ridge is arranged in the tool opposite to the first ridge, the second ridge is arranged in a mirror symmetrical arrangement, with the second ridge shifted by half of the distance between two adjacent first ridges. In an embodiment, a plurality of first ridges and/or a plurality of second ridges may be provided, thus a plurality of at least one of the first and second ridges.

Each of the first and second ridges can have a first end portion and a second end portion. The first and second end portions extend from the main portion. The angle between the front side and the first ridge or the second ridge can change progressively in at least one of the first and second end portions. In particular, the angle between the front side and the first ridge or the second ridge can be constant in the main portion. Thus the angle of the first or second end portion in the vicinity of the main portion corresponds with the angle of the main portion whereas the angle at the edge of the first or second end portion between the front side and the first and second ridges may reduce to 0°. Thereby, the angle of the corrugation at the edge of the sheet adjacent to the end portion is close to 90° or may even reach 90° with respect to the lateral sheet edge. The first and/or second lateral sheet side is parallel to the direction of advancement of the sheet through the sheet forming tool. If the sheet is used as a layer for a structured packing to be arranged in a mass transfer apparatus, the corrugation at the first and/or second lateral side of the sheet is extending parallel to the column main axis, thus in the most cases in vertical direction.

The first or second ridge can have a rounded top portion. Thereby the local bending stress at the top portion can be better distributed than in the case, the top portion is formed as an acute peak. If a rounded top portion is provided at least in the first and second end portions, the sheet can fit smoothly around the top portion thereby adopting the precise shape of the top portion. In an embodiment, the rounded top portion at the end portion has a radius of curvature which is greater than the radius of curvature of the main portion. The stepwise or continuous change of the radius of curvature leads to a profile which is particularly advantageous due to the fact that the combined stresses applied onto the sheet by the folding for obtaining the corrugation and the bending for obtaining the progressive change of angle of the corrugation can be better distributed. Thus the transition from the corrugation of constant angle of the main portion to a corrugation of variable angle in the end portion or end portions is smooth. Thereby a corrugation of a constant height is obtained. If such a corrugation is to be employed as a layer for a structured packing, such a layer is in contact with a neighbouring layer over the entire surface of the layer along the crests of the corrugations. In use, the layers of the structured packing are in contact with each of the neighbouring layers over the entire surface of the corrugated sheet. The mass transfer for such a structured packing can be performed under controlled conditions. Any maldistribution of any of the fluids passing over the surfaces of the corrugated sheets forming the layers of the structured packing can be avoided.

In an embodiment, the radius of curvature of the rounded top portion decreases continuously from the end portion to the main portion of the first or the second ridge.

The first or second ridge has a straight portion connecting the rounded top portion to the base element.

The straight portion has a thickness, which is smaller than the thickness of the base element. A distance is provided between the first finger element and the second finger element in their engaged position. The height of the first finger element and the second finger element remains substantially constant throughout the main section and the first and second end sections. The height of the main section and the first and second end sections of a finger element differ not more than 1%.

A method for manufacture of a corrugated sheet involves a step in which a sheet is advanced into a sheet forming tool according to any one of the preceding embodiments. Then the sheet forming tool is closed by moving the first finger element towards the second finger element into an engagement position. Thereby, the sheet is folded over the first ridge and the second ridge of the corresponding first finger element and second finger element. Subsequently, the sheet forming tool is opened by moving the first finger element away from the second finger element and the corrugated sheet is discharged from the sheet forming tool. Then, the sheet is advanced again and the method steps as pointed out above are repeated. Each of the first ridge and second ridge of the sheet forming tool comprises a main portion and an end portion and the angle β between each of the first ridge and second ridge in the main portion and the corresponding front side is at least partly different from the angle between each of the first ridge and second ridge in the end portion and the corresponding front side. A space is provided between the first finger element and the neighbouring second finger element in the engaged position.

The corrugated sheet according to an embodiment comprises a main section and a first end section and a second end section, and the first and second end sections are formed together with the main section by the first and second ridges, which are placed in the engagement position.

The first and second end portions of the finger elements of the shape forming tool make up only a small portion of the height of the sheet, thus the distance between the first lateral side and the second lateral side of the sheet or the corrugated sheet. According to an embodiment the main portion makes up at least 40% of the height, preferably at least 60% of the height of the sheet. Or in other words, according to this embodiment the main section makes up at least 40% of the height, preferably at least 60% of the height of the corrugated sheet 100.

The height of the corrugation in the main section manufactured by this method differs from the height of the corrugation in the end section by not more than 5%, preferably not more than 3%, particularly preferred not more than 1%, especially not more than 0.1%, which is unexpected as the single step manufacturing method employing a sheet forming tool offers less control possibilities than the prior art method. The prior art method requires the punching of the corrugation of the main section by a punching tool to the entire sheet and in a subsequent separate step to provide the modified structure of the first and second end section. During this subsequent step the corrugated sheet is subjected to rollers, which apply the modification of the corrugation by bending the sheet to such an extent, that the corrugation is oriented substantially normally to each of the lateral sides of the sheet.

The invention will be explained in more detail hereinafter with reference to drawings of exemplary embodiments:

FIG. 3 shows the section P-P of FIG. 2,

FIG. 4 shows the section Q-Q of FIG. 2,

FIG. 5a shows a sheet,

FIG. 5b shows a view on the lower part of the tool,

FIG. 5c shows a corrugated sheet,

FIG. 6 shows a view on the upper part of the tool,

FIG. 9 shows a section of a lower part and an upper part of a tool according to a second embodiment, FIG. 10 shows a section of a lower part and an upper part of a tool according to a third embodiment.

Figure 1:
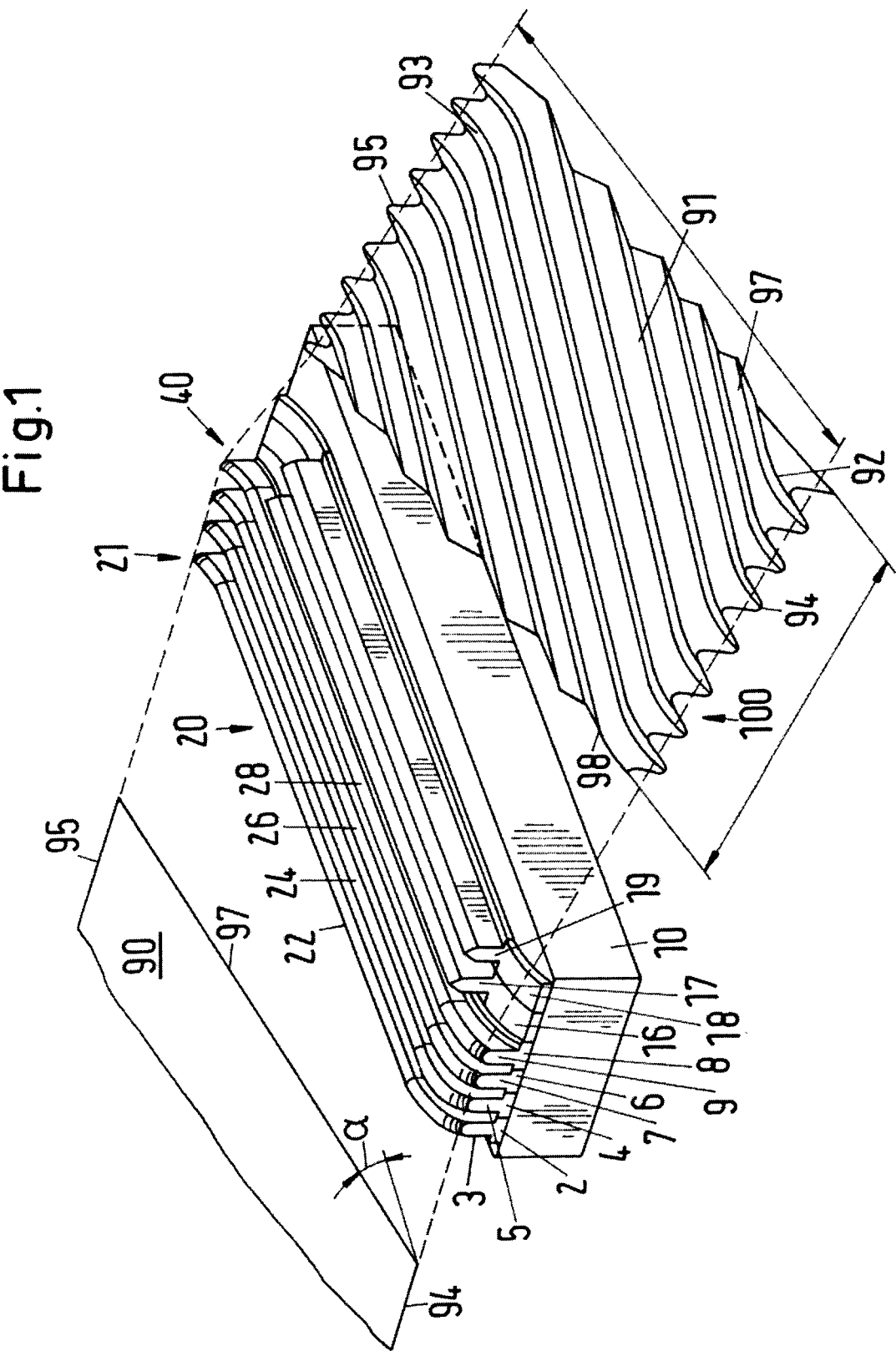
FIG. 1 shows in a perspective view of the lower part of the tool.

The sheet forming tool according to FIG. 1 is shown in a perspective view with the upper part thereof being omitted for the sake of simplicity and for being able to show the normally hidden elements of the tool. The lower tool element 40 has a plurality of first base elements 2, 4, 6, 8 and first finger elements 3, 5, 7, 9 and a support structure 10. Each of the first base elements and the first finger elements is a unitary piece. The first base elements and the first finger elements are arranged in substantially parallel arrangement. They are supported by the support structure 10. Furthermore a plurality of third finger elements 17, 19 is provided, which are connected to third base elements 16, 18. The third finger elements 17, 19 can be provided to shape the corrugations of the main section in a more precise manner but are in no way mandatory.

The first finger elements 3, 5, 7, 9 form first ridges 22, 24, 26, 28 for forming a corrugation peak in the sheet 90, which is placed onto the first ridges when the sheet forming tool is in operation. This is shown in FIG. 3 and FIG. 4 and FIG. 8.

Figure 8:
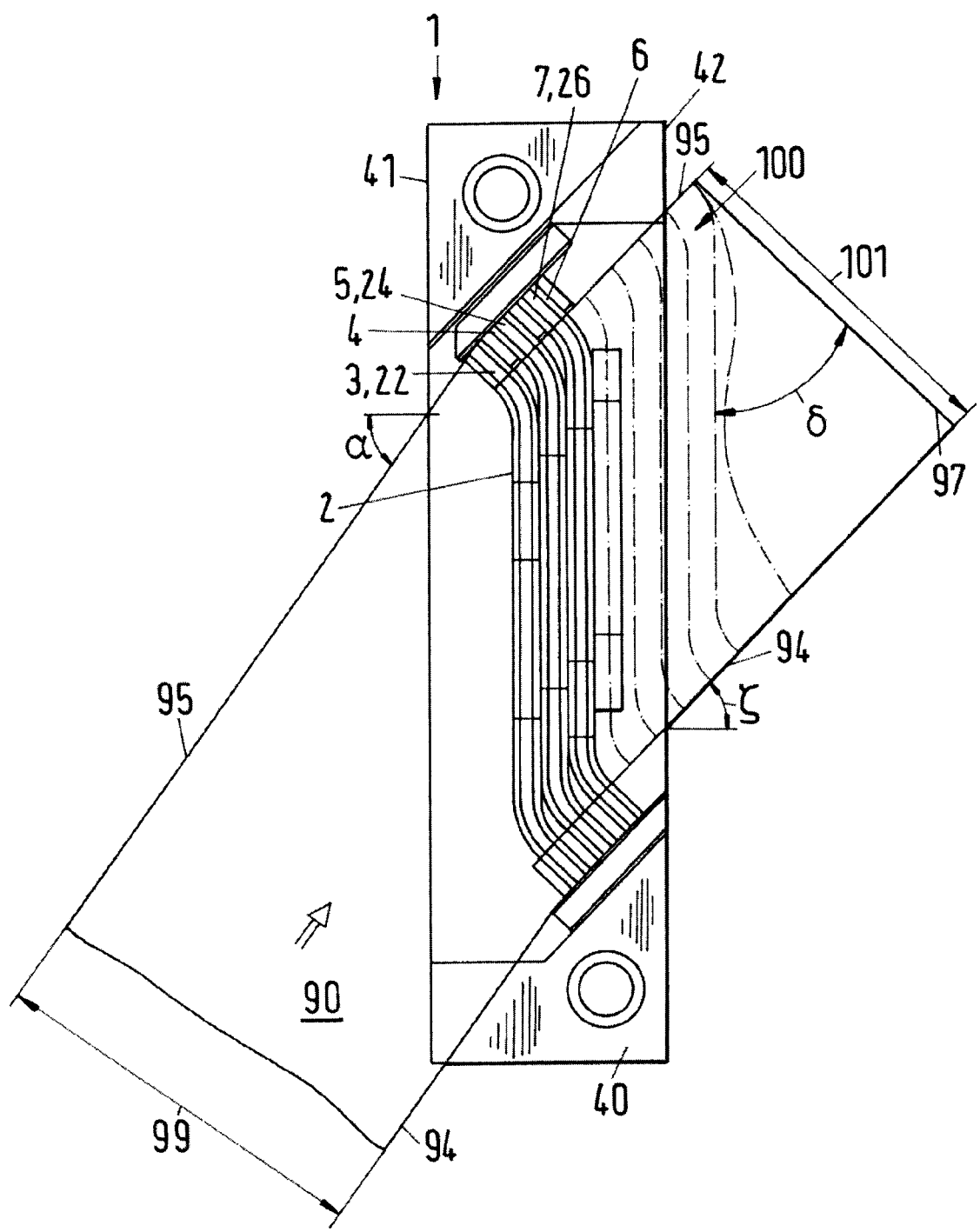
FIG. 8 shows a view on the lower part of the tool of FIG. 1.

In the embodiment according to FIG. 1 or FIG. 8 a sheet 90 is fed into the shape forming tool in an angle α to the front side of the main portion 20. The sheet 90 is in general of a rectangular shape and has a front edge 97, a first lateral side 94 and a second lateral side 95. The sheet habitually forms part of an endless band. The sheet 90 is transformed by the shape forming tool into a corrugated sheet 100. The corrugated sheet 100 is cut to the desired width and has consequently a rear edge 98 in addition to the front edge 97. The shortest distance between the front edge 97 and the rear edge 98 is the width of the packing layer. The distance is measured in a plane which is located at half the distance between the corrugation peaks and the corrugation troughs. The distance between the first lateral side 94 and the second lateral side 95 is usually referred to as the height of the packing layer. The distance between a peak of the corrugation and an adjacent trough of the corrugation is the height of corrugation 96.

Figure 7:
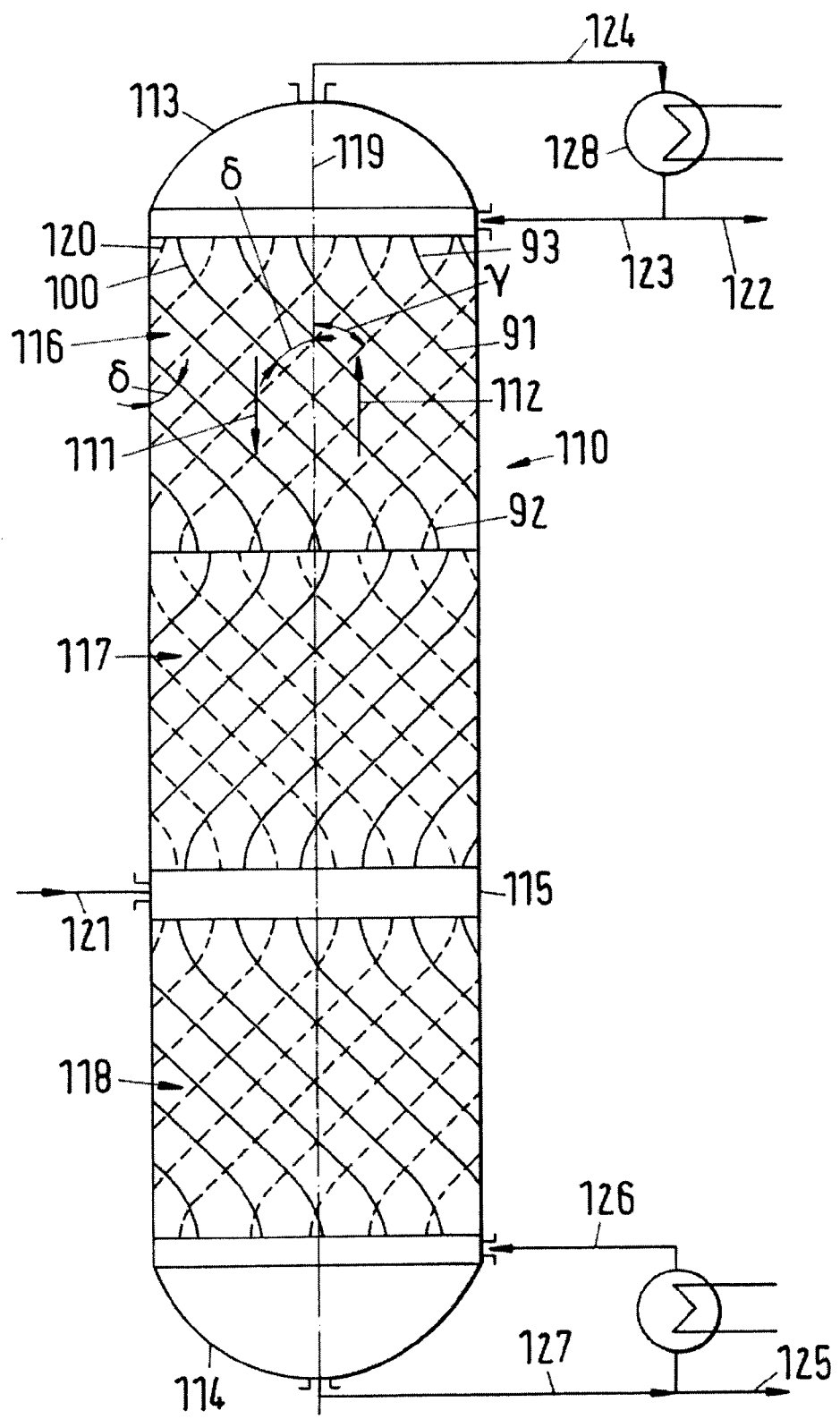
FIG. 7 shows a mass transfer apparatus and a structured packing arranged therein.

The packing layer formed by the shape forming tool 1 is thus the corrugated sheet 100. The corrugations form an angle of corrugation δ of inclination with the main axis of the mass transfer apparatus as shown in FIG. 7. For the packing layer according to FIG. 1 or FIG. 8, the tangent to the curve forming the ridge at the edge of the packing at the first lateral side 94 or the second lateral side 95 is substantially parallel to the main axis of the mass transfer apparatus. The angle of corrugation δ representing the inclination of such a corrugation lies typically between 10° and 70°. The corrugated sheet 100 has a main section 91 and a first end section 92 and a second end section 93. Each of the main section 91 and the first and second end sections 92, 93 is disposed with a plurality of corrugations. The angle of inclination of a corrugation of each of the first and second end sections 92, 93 differs from the angle δ of inclination of the main section 91. The main section 91 is arranged between the first end section 92 and the second end section 93. The angle of inclination of a corrugation of the first and second end section 92, 93 changes progressively, whereas the angle of inclination of a corrugation δ in the main section 91 is substantially constant. The progressive change of the angle in the first and second end section 92, 93 results in a decrease of the angle the corrugation forms with the axis of the packing sheet parallel to the main direction of fluid flow, which habitually corresponds in direction but not necessarily in location to the main axis of the mass transfer apparatus of FIG. 7 as a structured packing may be composed of a plurality of bricks which are arranged next to each other in the mass transfer apparatus. The main axis of the mass transfer apparatus is normal to the first lateral side 94 and the second lateral side 95 of the corrugated sheet 100. At the first lateral side 94 of the sheet or at the second lateral side 95 of the sheet, the angle may be reduced to 0°. In this case, the corrugation is oriented parallel to the axis of the mass transfer apparatus at the first lateral side 94 and the second lateral side 95.

Figure 2:
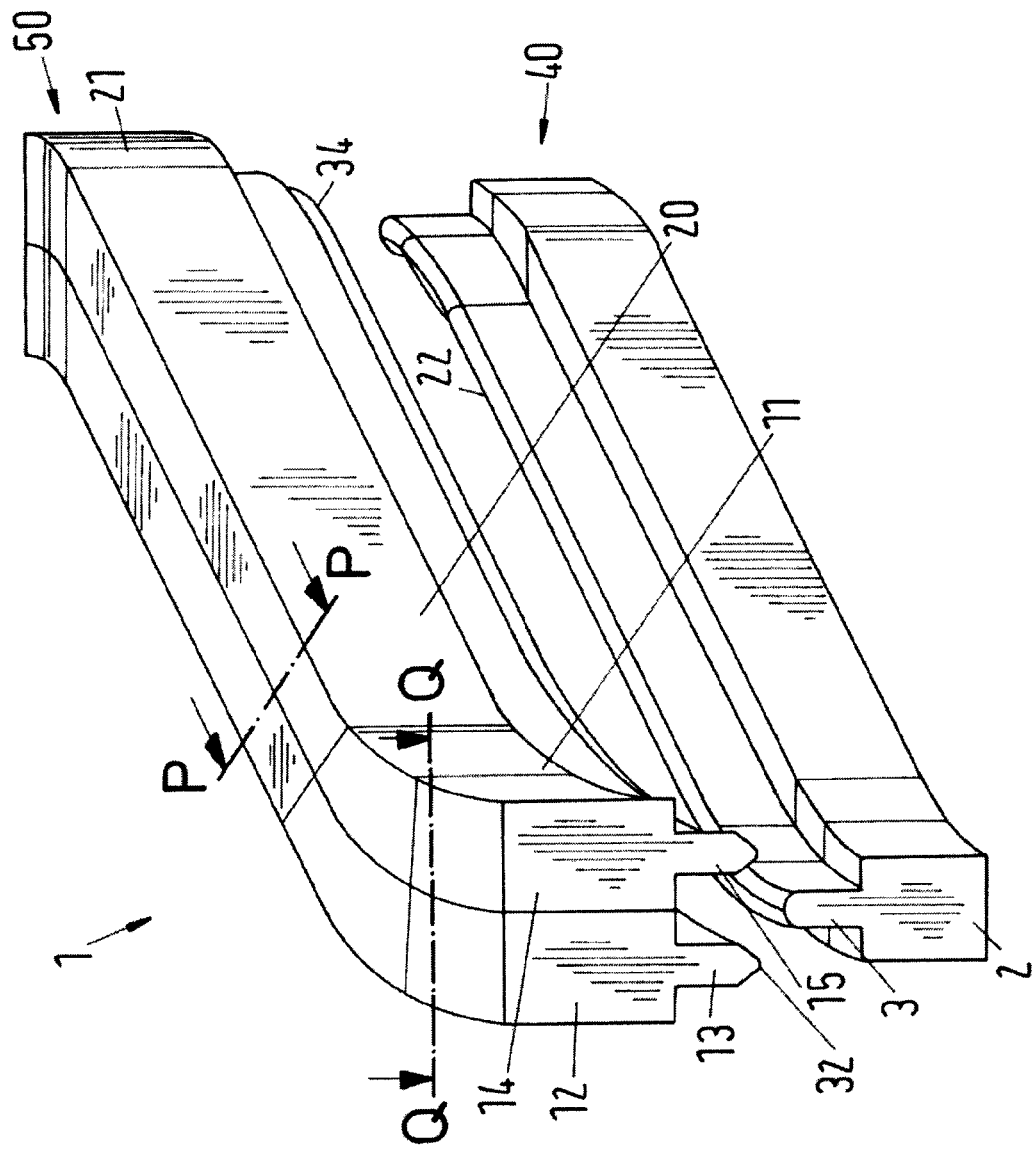
FIG. 2 shows the lower part and the upper part of the tool in an open position.

FIG. 2 shows both the upper tool element 50 as well as the lower tool element 40 in an open position. The upper tool element 50 has two second base elements 12, 14 and two second finger elements 13, 15 projecting from said second base element 12, 14. The second finger elements 13, 15 form a second ridge 32, 34 for forming a corrugation trough in the sheet, which is not shown in this FIG. 2. A first ridge 22 is arranged opposite to the second ridges 32, 34 and the first ridge is offset from the second ridges 32, 34 so as to allow for an engagement of the first finger element 3 and the second finger element 13, 15 in an engaged position. Each of the first ridge 22 and the second ridges 32, 34 comprises a main portion 20 and a first end portion 11 and a second end portion 21.

According to this embodiment the main portion 20 makes up at least 60% of the height, preferably at least 75% of the height. Or in other words, according to this embodiment the main section 91 makes up at least 60% of the height, preferably at least 75% of the height of the corrugated sheet 100.

FIG. 3 shows the section at the location P-P of FIG. 2. The section P-P is situated within the main portion 20. The first ridge 22 is shown in the engagement position with the second ridges 32, 34. The main section 91 of the corrugated sheet 100 is shaped in the engagement position.

The rounded top portion is followed by a straight portion connecting the rounded top portion to the base element. The first ridge has a peak and a first and second flank extending from said peak and forming the tip of said first finger element 3. The tip of said first finger element 3 is followed by a body, which is advantageously shaped as a straight portion. That means that the first and second flanks are arranged parallel to each other. The straight portion has a thickness, which is smaller than the thickness of the base element.

The second finger elements 13, 15 have the same structure as the first finger element 3. The distance between opposing flanks of neighbouring second finger elements is greater than the thickness of the straight portion of the first finger element. Thus, the first finger element can protrude into the space provided between the opposing flanks of the adjacent second finger elements. The depth of protrusion corresponds substantially to the engagement position and is roughly equivalent to the height of corrugation 96. It is the height of corrugation minus twice the thickness of the sheet. However it corresponds somehow with, i.e. it depends on the corrugation height or it is a function of the corrugation height. That means that between the peaks of the first ridge 22 and the second ridges 32, 34, the corrugation can adopt its shape freely.

The second base elements 12, 14 have a thickness, which is larger than the thickness of the corresponding second finger elements 13, 15. If the second base elements 12, 14 are in a contacting relationship along their common flank, their thickness is more than twice the thickness of the first finger element 3. According to the embodiment of FIG. 3 the first finger element 3 and the second finger elements 13, 15 have the same thickness. The first base element 2, and the second base elements 12, 14 also have the same thickness.

According to an embodiment the distance between the finger elements can be variable. As a further alternative, the distance between neighbouring finger elements is obtained by spacing elements, as shown for instance in FIG. 9 or FIG. 10.

FIG. 4 shows the section Q-Q of FIG. 2. The section Q-Q is situated within the first or second end portion 11, 21 of the first ridge 22, which are shown in the engagement position with the second ridges 32, 34. In FIG. 4 the first end section 92 of the corrugated sheet 100 is shaped in the engagement position of the first ridge 22 with the second ridges 32, 34. The arrangement of the base elements and the finger elements corresponds to the arrangement as described in connection with FIG. 3. However, the first finger element 3 and the second finger elements have a rounded top portion. Thus the peak of the first ridge 22 and the second ridges 32, 34 has a larger radius of curvature than the peaks according to FIG. 3. Thus, the rounded top portion at each of the first and second end portions 11, 21 can have a radius of curvature which is greater than the radius of curvature of the main portion 20. The transition from the shape of the top portion as shown for example in FIG. 3 and the top portion as shown for example in FIG. 4 can change gradually. Alternatively the transition can be stepwise. In FIG. 2 each of the first and second end portions 11, 21 is subdivided into two subsections. The radius of curvature of the top portion in the outermost sub-sections of FIG. 2 is greater than the radius of curvature of the top portion in the innermost sub-sections of the first and second end portions 11, 21. The radius of curvature of the top portion in the innermost sub-sections of the first and second end portions 11, 21 is greater than the radius of curvature of the top portion of the main portion 20.

FIG. 5a shows a view on a portion of a sheet 90. The sheet 90 has a front edge 97 and a first lateral side 94 as well as a second lateral side 95. The first lateral side 94 and the second lateral side 95 are arranged in an angle of 90° to the front edge 97. The sheet also has a rear edge, which is not shown. The sheet may be a band which may be supplied from a roll, also not shown.

FIG. 5b shows a view on the lower part of the tool according to a further embodiment. The lower tool element has a support structure 10 having a front side 23 and a rear side 25 and the first finger elements 3, 5, 7 and the first base elements 2, 4, 6. The first finger elements 3, 5, 7 are represented by a single line. These finger elements can be of the same shape as the finger element 3 shown in FIG. 3 or FIG. 4.

Each of the ridges, finger elements and base elements of the upper and lower tool element form a main portion 20 and a first end portion 11 and a second end portion 21.

The angle β, 36 between each of the first ridges 22, 24, 26 or second ridges 32, 34 in the main portion 20 and the corresponding front side 23, 33 is at least partly different from the angle between each of the first ridge 22, 24, 26 or second ridge 32, 34 in the first and second end portions 11, 21 and the corresponding front side 23, 33 and a space is provided between the first finger elements 3, 5, 7, 9 and the corresponding neighbouring second finger elements 13, 15 in the engaged position.

The angle between of the front edge 97 of the sheet 90 and the main portion 20 in the plane containing the first ridges 22, 24, 26, 28 of the first finger elements 3, 5, 7, 9 is according to this embodiment 0°. This embodiment could be preferred in particular, if the first and second end portions 11, 21 make up a considerable portion of the height of the sheet, thus the distance between the first lateral side 94 and the second lateral side 95. According to this embodiment, the main portion 20 makes up at most 60% of the height of the corrugated sheet, preferably at most 50% of the height of the corrugated sheet, particularly preferred at most 30% of the height of the corrugated sheet.

FIG. 5c shows a corrugated sheet 100. The corrugated sheet 100 has a front edge 97 and a first lateral side 94 as well as a second lateral side 95. The first lateral side 94 and the second lateral side 95 are arranged in an angle of 90° to the front edge 97. The sheet also has a rear edge 98. This rear edge 98 is obtained by cutting the corrugated sheet 100 to the desired width. A cutting tool for this purpose is disclosed in U.S. Pat. No. 6,500,048.

FIG. 6 shows a view on the upper part of the tool for obtaining a corrugated sheet as shown in FIG. 5c. FIG. 6 is shown in a flipped presentation. When turned down on the arrangement to form the upper part of the shape forming tool in the position of FIG. 2 its outer side would be seen from above. The upper tool element 50 comprises the second ridges 32, 34 being formed by the second finger elements 13, 15 which are connected to the second base elements 12, 14. The second finger elements 13, 14 are only presented as lines for reason of simplification, but they have a thickness as shown in FIG. 3 or FIG. 4. Each of the second finger elements 13, 14 forms a unit with the corresponding second base element 12, 14. The upper tool element 50 further has a support structure 30. Furthermore the sheet forming tool has a front side 33, oriented toward the sheet 90 to be fed to the tool and a rear side 35, at which the corrugated sheet 100 of FIG. 5c leaves the sheet forming tool.

The angle β, 36 between each of the second ridges 32, 34 in the main portion 20 and the corresponding front side 33 is at least partly different from the angle between each of the second ridges 32, 34 in the first and second end portions 11, 21 and the corresponding front side 33.

FIG. 7 shows a mass transfer apparatus 110 such as a column or tower for performing a mass transfer between a descending fluid 111 of higher density and a fluid 112 of lower density flowing in counter current direction to the fluid of higher density 111, thus ascending inside the mass transfer apparatus. The main direction of flow of both fluids is shown by respective arrows. Each of the fluids can be one of a gas or a liquid phase.

The mass transfer apparatus has an upper end 113, also named head, and a lower end 114, also named sump. Between the upper and lower ends a cylindrical section 115 is provided. The cylindrical section can contain at least one structured packing, in many cases a plurality of structured packings. In FIG. 7 a first structured packing 116, a second structured packing 117 and a third structured packing 118 are provided. Neighbouring packings are usually turned by 90° around their axis, a feature which has been omitted in FIG. 7 for simplification. Each of the structured packings is composed of a plurality of layers, which are formed by corrugated sheets 100. Neighbouring corrugated sheets are positioned cross-wise to each other. In FIG. 7 a second corrugated sheet 120 is visualised by dotted lines, which is arranged behind a first corrugated sheet 100, which is visible when the mass transfer apparatus is cut open in a plane containing its central axis 119. The corrugated sheets 100, 120 are arranged parallel to the central axis, here in vertical direction. The corrugated sheet 100 has a main section 91, a first end section 92 and a second end section 93. The corrugations of the main section 91 of the corrugated sheet 100 have a constant inclination and are arranged in an angle of corrugation δ to the central axis 119. The corrugations of the main section 91 of the second corrugated sheet 120 have a constant inclination and are arranged in an angle of corrugation γ to the central axis 119. For obtaining a regular distribution of the fluids across the cross-section of the structured packing, the angle γ is equal to −δ (minus delta). The cross-section is the dimension of the packing in a plane normal to the central axis 119.

The mass transfer apparatus 110 has a fluid inlet or feed 121 which is separated by the mass transfer performed in the mass transfer apparatus into a head product 122 and a sump product 125. For a distillation apparatus, the feed is positioned somewhere between the bottom and the top of the column. The vaporised fluid 112 of lower density is discharged from the upper end 113 of the mass transfer apparatus as a head discharge 124. The head discharge 124 is at least partially condensed in a condenser 128. When referring to a distillation apparatus, the condensed head discharge is partially recycled back into the mass transfer apparatus as a head reflux 123. When referring to other mass transfer operations than distillation, this head reflux is generated by a direct feed of a fluid of higher density. It is needed to keep the mass transfer apparatus in continuous operation by providing fluid to descend the corrugated sheets of the first structured packing 116. The fluid of higher density is collected in the lower end 114 of the mass transfer apparatus. The sump discharge 127 leaves the lower end 114 and is in the case of a distillation apparatus at least partially recycled back into the mass transfer apparatus as vaporised sump reflux 126 to provide fluid of lower density for performing a mass transfer in the third structured packing 118. The sump reflux 126 is obtained by partial vaporization of the sump discharge 127 in the reboiler 129.

When referring to other mass transfer operations than distillation, the fluid of lower density is directly obtained from the bottom feed stream. The remainder of the sump discharge 127 leaves the mass transfer apparatus as sump product. The reboiler and the condenser are heat exchangers. The distribution of the fluids of lower density and the fluids of higher density within the mass transfer apparatus may be performed with distributors, which are not shown in FIG. 7. Each of the structured packings is supported within the wall of the cylindrical section by appropriate means, such as loose collars or support beams, whatever appropriate for the diameter of the mass transfer apparatus, which can be in the range from 10 cm up to 5 m. If the mass transfer apparatus is a distillation apparatus, the fluid of lower density is a gas phase and the fluid of higher density is a liquid phase. If the mass transfer apparatus is an extraction apparatus, the fluid of lower density is a lighter liquid and the fluid of higher density is a heavier liquid.

FIG. 8 is a view on an embodiment which differs from FIG. 1 only in the number of ridges provided and in that only a single third finger element is provided. This embodiment shows a view on the lower tool element 40 of the shape forming tool 1. This lower tool element contains the first finger elements 3, 5, 7 which comprise the first ridges 22, 24, 26. The first finger elements are connected to first base elements 2, 4, 6. The finger elements form protrusions which terminate in the ridges. A finger element of an upper tool element may be introduced at least partly into the gap formed between each of the finger elements. The upper tool element and the lower tool element engage at least partly for forming a corrugation onto the sheet to impose the corrugation pattern onto the sheet. The lower tool element has a main portion 20, which has a front end 41 and a rear end 42. The front end 41 is arranged parallel to the rear end 42.

The first or second lateral side 94, 95 of the sheet 90 and a line normal to the plane containing the front end 41 of the main portion 20 of the lower tool element include an angle α to each other. The angle is measured in a plane containing the first ridges 22, 24, 26 of the first finger elements 3, 5, 7. The angle α may lay in the range form 0° up to 80°. The corrugated sheet leaves the shape forming tool at an angle ζ, which is in this case about the same as the angle of corrugation δ as the sheet 90 changes its direction of advancement when passing the shape forming tool 1. The angle α is greater than the angle ζ.

This embodiment allows to reduce the dimensions of the shape forming tool to a considerable extent, compared to the embodiment according to FIG. 5a-5c or FIG. 6. Consequently, a reduced amount of material is required for the manufacture of the shape forming tool. The shape forming tool is built in a punch press, which contains the drive means for opening and closing the upper tool element 40 and the lower tool element 50. At one hand, the material and manufacturing costs for the punching press and the shape forming tool are lowered due the fact that the dimensions of the shape forming tool are decreased. The shape forming tool is also reduced in weight. Therefore on the other hand the operational costs are decreased, due to the fact that the weight of the upper and lower tool element 40, 50 is decreased. Thereby the forces to move the upper and/or the lower tool element into and out of the engagement position are reduced which brings about considerable energy savings and an increase in the life time of the shape forming tool. In addition a smaller punch press can be designed due to the reduction of forces, which additionally results in reduced investment costs as well as a reduction in required production space.

The width of the sheet 90 is indicated by arrow 99. The width is the normal distance between the first lateral side 94 and the second lateral side 95. The width of the corrugated sheet 100 is indicated by arrow 101. The width of the sheet 99 is thus greater than the width of the corrugated sheet 101. If according to a preferred embodiment, the width of the sheet 99 is 240 mm, then the width of the corrugated sheet 101 can vary between value of 195 mm to 220 mm depending on the type of the corrugation, thus the angle of corrugation δ and the height of corrugation and the pitch of corrugation, thus the distance between two adjacent crests of the corrugation.

FIG. 9 shows a section through a finger element similar to FIG. 2 situated at a location within the main portion 20. The first ridge 22 is shown in the engagement position with the second ridges 32, 34. The main section 91 of the corrugated sheet 100 is shaped in the engagement position. The rounded top portion of the finger element is followed by a straight portion connecting the rounded top portion to the base element. Furthermore the thickness of the finger elements 3, 13, 15 and the corresponding base elements 2, 12, 14 is the same. There is a spacing element 60 provided between neighbouring base elements. According to a variant not shown in the figures, the distance between the fingers can be variable.

FIG. 10 shows a section through a finger element similar to FIG. 2. This section is situated within the first or second end portion 11, 21 of the first ridge 22, which are shown in the engagement position with the second ridges 32, 34. In FIG. 10 the first end section 92 of the corrugated sheet 100 is shaped in the engagement position of the first ridge 22 with the second ridges 32, 34. The arrangement of the base elements and the finger elements corresponds to the arrangement as described in connection with FIG. 3. However, the first finger element 3 and the second finger elements have a rounded top portion. Thus the peaks of the first ridge 22 and the second ridges 32, 34 have a larger radius of curvature than the peaks according to FIG. 3. Thus, the rounded top portion at each of the first and second end portions 11, 21 has a radius of curvature which is greater than the radius of curvature of the main portion 20. Furthermore a stepwise transition can be provided between the finger elements 3, 13, 15 and the corresponding base elements 2, 12, 14. There are spacing elements 70 provided between neighbouring base elements on at least one of the upper and lower tool elements. Alternatively a single spacing element can be provided as shown in FIG. 9. The spacing elements can be of variable width, thereby a plurality of different corrugations can be shaped. If the spacing element has a small width, the distance between adjacent peaks on the corrugated sheet will decrease and a steeper slope of the corrugations can be obtained.

Based on these exemplary embodiments, many variations are possible. Thus, the tool may have any desired length. The number of finger elements in each of the upper or lower tool may vary and differ from the embodiments shown in FIG. 1 to FIG. 6. Furthermore the tool may have a modular design. Thus a plurality of support structures may be provided. Each of the finger elements and base elements may be formed as a single piece or may be composed of a plurality of pieces. Alternatively each of the finger elements and base elements may form an integral part with their own support structure. This arrangement has the advantage, that individual finger elements can be added or removed easily by a simple assembly or disassembly step.

The invention claimed is:

1. A sheet forming tool (1) for the manufacture of a corrugated sheet having a lower tool element (40) and an upper tool element (50), each of the upper tool element and the lower tool element having a front side (23, 33, 41) and a rear side (25, 35, 42), wherein the lower tool element (40) comprises a first base element (2, 4, 6, 8) and a first finger element (3, 5, 7, 9) projecting from said first base element (2, 4, 6, 8), the first finger element (3, 5, 7, 9) forming a first ridge (22, 24, 26, 28) for forming a corrugation peak in the sheet, wherein the upper tool element (50) comprises a second base element (12, 14) and a second finger element (13, 15) projecting from said second base element (12, 14), the second finger element (13, 15) forming a second ridge (32, 34) for forming a corrugation trough in said sheet, with the first ridge (22, 24, 26, 28) being arranged opposite to the second ridge (32, 34) and the first ridge (22, 24, 26, 28) being offset from the second ridge (32, 34) so as to allow for an engagement of the first finger element (3, 5, 7, 9) and the second finger element (13, 15) in an engaged position, and each of the first ridge (22, 24, 26, 28) and second ridge (32, 34) comprises a main portion (20) and an end portion (11, 21) and the angle β (36) between each of the first ridge (22, 24, 26, 28) and second ridge (32, 34) in the main portion (20) and the corresponding front side (23, 33, 41) being at least partly different from the angle between each of the first ridge (22, 24, 26, 28) and second ridge (32, 34) in the end portion (11, 21) and the corresponding front side and a space is provided between the first finger element (3, 5, 7, 9) and the neighbouring second finger element (13, 15) in the engaged position, wherein between the main portion (20) of the first ridge of the first finger element and the main portion (20) of the second ridge of the neighbouring second finger element, the sheet is not in contact with either finger element but is allowed to form freely in the space between the main portion (20) of the first ridge of the first finger element (3, 5, 7, 9) and main portion (20) of the second ridge of the neighbouring second finger element (13, 15) in the engaged position, and wherein the main portion (20) of the first ridge of the first finger element and the main portion (20) of the second ridge of the neighbouring second finger element interact with the sheet in the engaged position to form a linear portion of a corrugation in the sheet.

2. The tool according to claim 1, wherein the first ridge (22, 24, 26, 28) is arranged in a mirror symmetrical arrangement to the second ridge (32, 34).

3. The tool according to claim 1, wherein a plurality of at least one of the first ridges (22, 24, 26, 28) and second ridges (32, 34) is provided.

4. The tool according to claim 1, wherein each of the first and second ridges has a first end portion (11) and a second end portion (21).

5. The tool according to claim 4, wherein the angle between the front side (23, 33) and the first ridge (22, 24, 26, 28) or the second ridge (32, 34) changes progressively in at least one of the first and second end portions (11, 21).

6. The tool according to claim 4, wherein the angle β (36) between the front side (23, 33) and the first ridge (22, 24, 26, 28) or the second ridge (32, 34) in the main portion (20) is constant.

7. The tool according to claim 1, wherein the first finger element or the second finger element has a rounded top portion.

8. The tool according to claim 7, wherein the rounded top portion at the end portion (11, 21) has a radius of curvature which is greater than the radius of curvature of the main portion (20).

9. The tool according to claim 8, wherein the radius of curvature of the rounded top portion decreases continuously from the end portion (11, 21) to the main portion (20).

10. The tool according to claim 7, wherein the rounded top portion is followed by a straight portion connecting the rounded top portion to the base element.

11. The tool according to claim 10, wherein the straight portion has a thickness, which is smaller than the thickness of the base element.

12. The tool according to claim 1, wherein the height of the first finger element (3, 5, 7, 9) and the second finger element (13, 15) remains substantially constant throughout the main section and the first and second end sections.

13. A method for manufacture of a corrugated sheet (100), wherein a sheet (90) is advanced into a sheet forming tool (1), the sheet forming tool (1) having a lower tool element (40) and an upper tool element (50), each of the upper tool element and the lower tool element having a front side (23, 33, 41) and a rear side (25, 35, 42), wherein the lower tool element (40) comprises a first base element (2, 4, 6, 8) and a first finger element (3, 5, 7, 9) projecting from said first base element (2, 4, 6, 8), the first finger element (3, 5, 7, 9) forming a first ridge (22, 24, 26, 28) for forming a corrugation peak in the sheet, wherein the upper tool element (50) comprises a second base element (12, 14) and a second finger element (13, 15) projecting from said second base element (12, 14), the second finger element (13, 15) forming a second ridge (32, 34) for forming a corrugation trough in said sheet, with the first ridge (22, 24, 26, 28) being arranged opposite to the second ridge (32, 34) and the first ridge (22, 24, 26, 28) being offset from the second ridge (32, 34) so as to allow for an engagement of the first finger element (3, 5, 7, 9) and the second finger element (13, 15) in an engaged position the sheet forming tool (1) is closed by moving a first finger element (3, 5, 7, 9) towards a second finger element (13, 15) into an engagement position such that the sheet (90) is folded over the first ridge (22, 24, 26, 28) and the second ridge (32, 34) of the corresponding first finger element (3, 5, 7, 9) and second finger element (13, 15), then the sheet forming tool (1) is opened by moving the first finger element (3, 5, 7, 9) away from the second finger element (13, 15) and the corrugated sheet (100) is discharged from the sheet forming tool, and each of the first ridge (22, 24, 26, 28) and second ridge (32, 34) comprises a main portion (20) and an end portion (11, 21) and the angle β (36) between each of the first ridge (22, 24, 26, 28) and second ridge (32, 34) in the main portion (20) and the corresponding front side (23, 33, 41) being at least partly different from the angle between each of the first ridge (22, 24, 26, 28) and second ridge (32, 34) in the end portion (11, 21) and the corresponding front side and a space is provided between the first finger element (3, 5, 7, 9) and the neighbouring second finger element (13, 15) in the engaged position, wherein between the main portion (20) of the first ridge of the first finger element and the main portion (20) of the second ridge of the neighbouring second finger element, the sheet is not in contact with either finger element but is allowed to form freely in the space between the main portion (20) of the first ridge of the first finger element (3, 5, 7, 9) and main portion (20) of the second ridge of the neighbouring second finger element (13, 15) in the engaged position, and wherein the main portion (20) of the first ridge of the first finger element and the main portion (20) of the second ridge of the neighbouring second finger element interact with the sheet in the engaged position to form a linear portion of a corrugation in the sheet.

14. The method of claim 13, wherein the corrugated sheet (100) comprises a main section (91) and a first end section (92) and a second end section (93), and the first and second end sections (92, 93) are formed together with the main section (91) by the first and second ridges (22, 24, 26, 28, 32, 34) which are placed in the engagement position.

15. The sheet forming tool (1) of claim 1, wherein between the end portion of the first ridge of the first finger element and the end portion of the second ridge of the neighbouring second finger element, the sheet is not in contact with either finger element but is allowed to form freely in the space between the end portions of the first ridge of the first finger element (3, 5, 7, 9) and end portion of the second ridge of the neighbouring second finger element (13, 15) in the engaged position.

16. The method of claim 13, wherein between the end portion of the first ridge of the first finger element and the end portion of the second ridge of the neighbouring second finger element, the sheet is not in contact with either finger element but is allowed to form freely in the space between the end portions of the first ridge of the first finger element (3, 5, 7, 9) and end portion of the second ridge of the neighbouring second finger element (13, 15) in the engaged position.

17. The tool according to claim 1, wherein the angle β (36) between each of the first ridge (22, 24, 26, 28) and second ridge (32, 34) in the main portion (20) and the corresponding front side (23, 33, 41) is constant.

18. The method of claim 13, wherein the angle β (36) between each of the first ridge (22, 24, 26, 28) and second ridge (32, 34) in the main portion (20) and the corresponding front side (23, 33, 41) is constant.

\* \* \* \* \*